Jan. 20, 1931.   G. WIEDEKE   1,789,572
TUBE CUTTING TOOL
Filed June 11, 1928   2 Sheets-Sheet 1
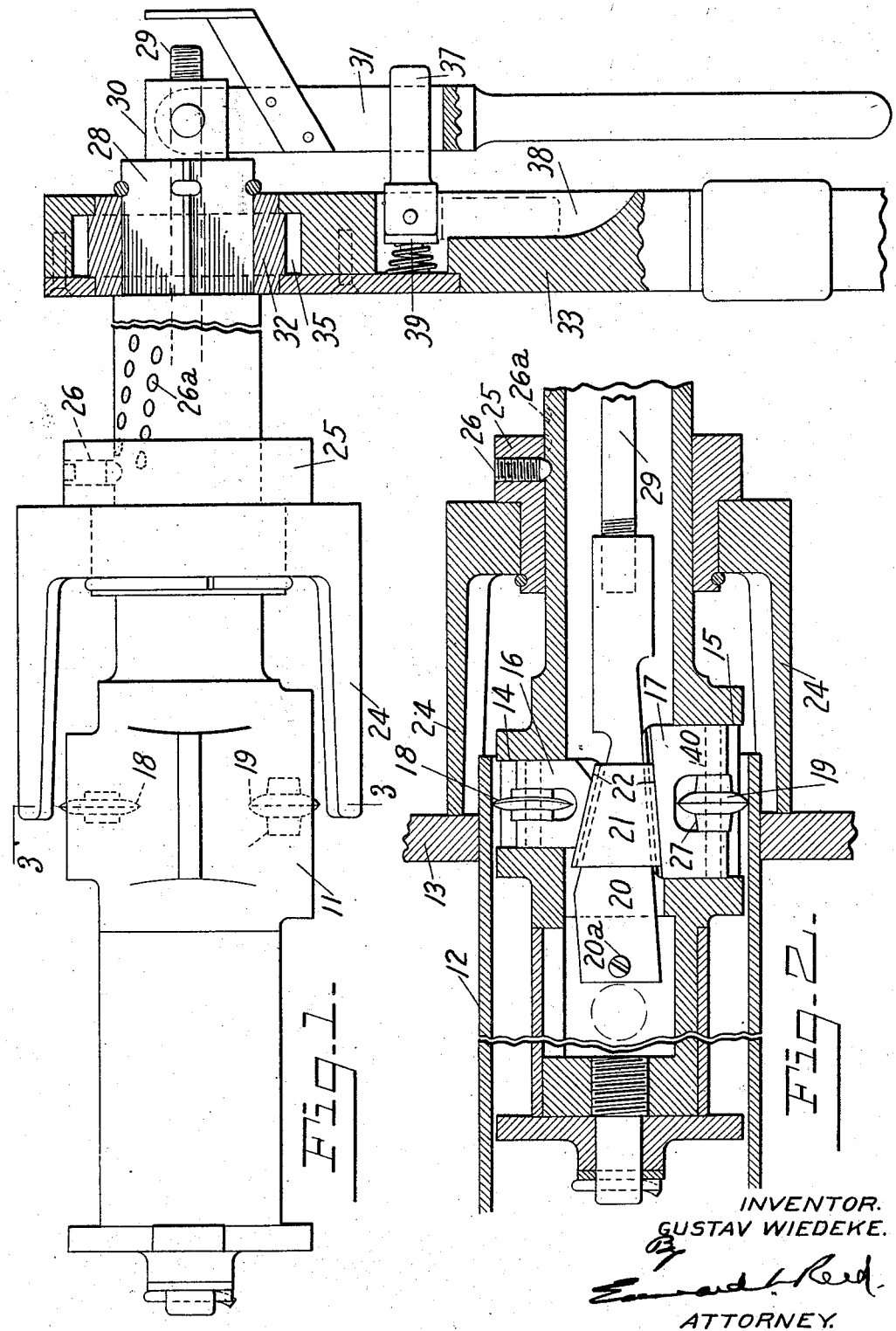
INVENTOR.
GUSTAV WIEDEKE.
ATTORNEY.

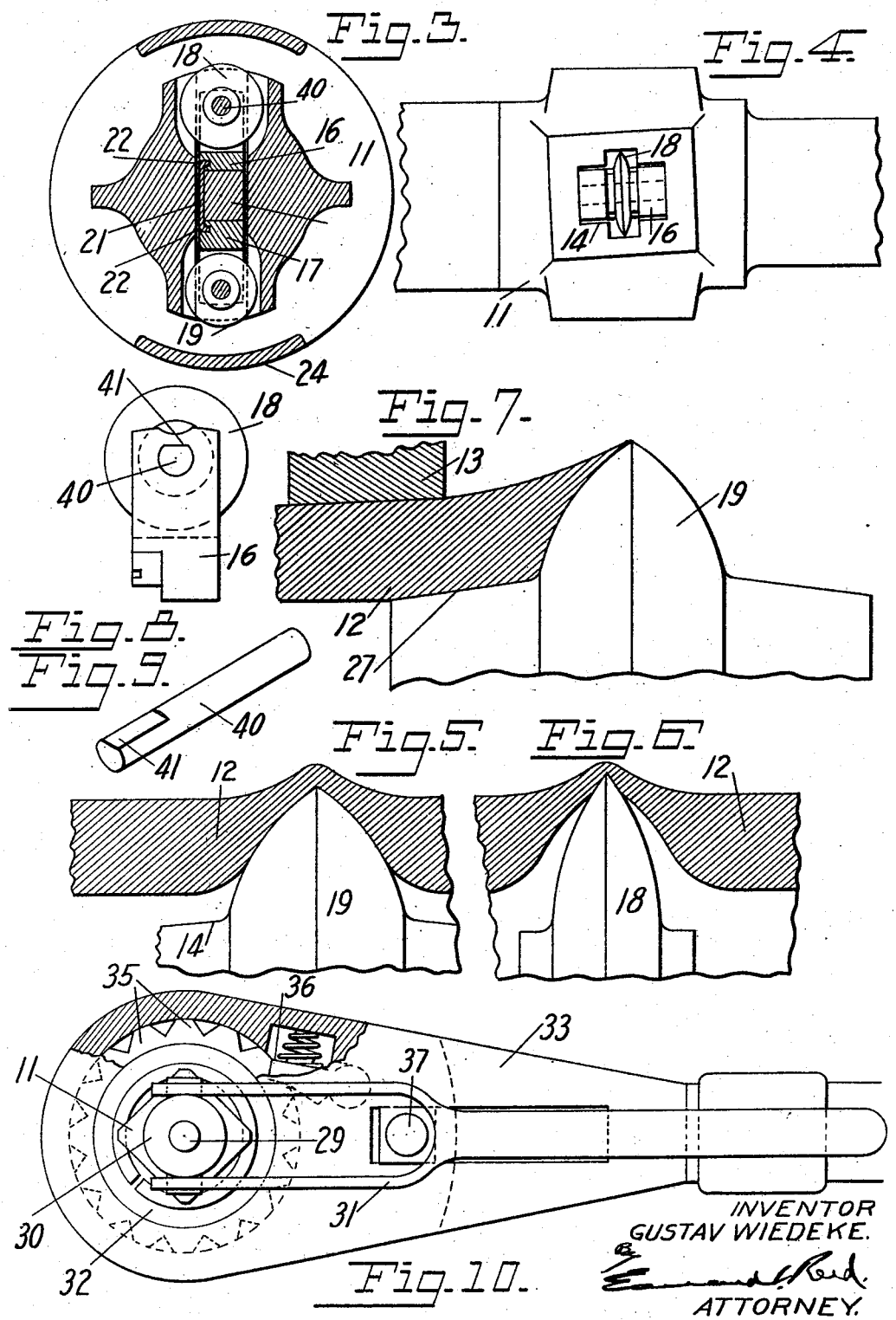

Patented Jan. 20, 1931

1,789,572

UNITED STATES PATENT OFFICE

GUSTAV WIEDEKE, OF DAYTON, OHIO, ASSIGNOR TO GUSTAV WIEDEKE COMPANY, OF DAYTON, OHIO, A CO-PARTNERSHIP CONSISTING OF GUSTAV WIEDEKE, OTTO WIEDEKE, AND ROBERT WIEDEKE

TUBE-CUTTING TOOL

Application filed June 11, 1928. Serial No. 284,377.

This invention relates to a tube cutting tool and one object of the invention is to provide a tube cutting tool of such a character that the cutter or rotatable blade may travel through the kerf on successive rotations of the tool with little or no frictional contact with the walls thereof, thus facilitating and expediting the cutting operation.

A further object of the invention is to provide such a cutting tool which will be simple in its construction and operation.

A further object of the invention is to provide a cutting tool in which one of the cutters will have means for flaring the end of the tube at the completion of the cutting operation preparatory to the beading of the tube.

Other objects of the invention will appear as the device is described in detail.

In the accompanying drawings Fig. 1 is a side elevation, partly in section, of a cutting tool embodying my invention; Fig. 2 is a longitudinal sectional view taken through the body of the tool, and showing the same inserted in the tube; Fig. 3 is a transverse section taken on the line 3—3 of Fig. 1; Fig. 4 is a plan view of a portion of the tool showing the position of one of the cutters; Fig. 5 is an enlarged detail view showing the action of the flaring cutter on the kerf; Fig. 6 is a similar view showing the pilot cutter in the enlarged kerf; Fig. 7 is a similar view showing the flaring cutter at the end of the cutting operation; Fig. 8 is a side elevation of one of the carrier blocks for the cutters; Fig. 9 is a detail view of one of the cutter supporting pins; and Fig. 10 is a side elevation, partly broken away, of the operating handle or wrench.

In these drawings I have illustrated one embodiment of my invention and have shown the same in connection with a tube cutting tool of the type shown and described in Patent No. 1,357,367, granted November 2, 1920, to Otto Wiedeke. This tool comprises a tubular body portion 11, a portion of which is adapted to be inserted in a tube, a portion of a boiler tube being shown at 12 mounted in a tube sheet 13. The intermediate portion of the body of the tool is provided with substantially radial guideways 14 and 15 in which are slidably mounted blocks 16 and 17 which form carriers for the cutters or rotatable blades 18 and 19. The carrier blocks and cutters are preferably actuated by an expanding device or wedge 20 which is mounted for longitudinal movement in the body 11 of the tool and is of such a character that when it is moved outwardly, that is, toward the outer end of the boiler tube 12, the cutters will be caused to engage the inner surface of the tube. The carrier blocks have their inner surfaces inclined toward the outer end of tool and the expanding device or wedge 20 is located between the two carrier blocks and engages these inclined surfaces so that the outward movement of the expanding device will impart radial movement to the carrier blocks. As here shown, the expanding device has secured thereto a plate 21 the edges of which are bent over to form transverse flanges 22 which engage in slots in the respective carrier blocks and serve to retract the carrier blocks and the cutters when the expanding device is moved inwardly. A stop, such as a screw 20a, is inserted in the inner end of the expanding device or wedge and extends laterally therefrom to engage the body of the tool to limit the outward movement of the expanding device. This screw may be removed to permit a further movement of the expanding device to eject the cutter carriers.

Mounted on the outer portion of the body of the tool is a guard 24 which engages the tube sheet to properly locate the cutters with relation to the tube which is to be cut. As here shown, this guard is rotatably mounted on the collar 25 which is adjustably mounted on the tool by means of a set screw 26, which is adapted to enter any one of a series of recesses 26a in the body of the tool, thus enabling the guard to be so positioned with relation to the tool as to retain the cutters in the desired position with relation to the tube and to permit the tool to be rotated with relation to the guard.

For the purpose of facilitating and expediting the cutting operation I have so shaped and arranged the cutters, two of which are shown in the present instance, that the initial or pilot cutter will perform the major part of the cutting and the kerf formed by the pilot cutter will be spread or flared outwardly so that the pilot cutter may pass through that kerf, in making the succeeding cut, without frictionally engaging the sides thereof, thereby eliminating practically all frictional resistance to the operation of the cutter. Preferably this is accomplished by providing a flaring device which may be in the form of a cutter and which is so mounted on the tool that it will travel in the kerf formed by the pilot cutter and which is of such a thickness that it will enlarge the kerf beyond the thickness of the pilot cutter. As here shown, the pilot cutter 18 is in the form of a relatively thin disk the lateral surfaces of which taper outwardly to a sharp cutting edge. The second cutter 19 constitutes the flaring or spreading device and is in the form of a disk which is of a materially greater thickness than the pilot cutter and has a comparatively blunt edge but this edge is tapered to enter the kerf formed by the pilot cutter and thus spread or separate the lateral walls of that kerf, as is clearly shown in Figs. 5 and 6. Preferably the flaring cutter also has a cutting action and will to some extent deepen the kerf but this is not necessary to the satisfactory operation of the device. That surface of the expanding device or wedge 20 which acts on the carrier 16, for the pilot cutter 18, is arranged at a greater inclination than is the surface that acts on the carrier 17 for the spreading disk or cutter. This shape of the wedge coupled with the thin sharp character of the pilot cutter will cause the pilot cutter to be at all times advanced more rapidly and to a greater extent than is the spreading disk and consequently the pilot cutter will perform the major part of the cutting operation.

The pilot cutter 18 is here shown as mounted on an axis slightly inclined with relation to the length of the tool, as shown in Fig. 4, so that in the rotation of the tool this inclined cutter will tend to draw the cutter into the tube and will thus hold the guard 24 firmly against the tube sheet. The flaring cutter or disk 19 has tapered hubs 27 of relatively large diameter and so arranged that at the completion of the cutting operation one of these hubs will engage the projecting end portion of the tube and will flare the same outwardly, as shown in Fig. 7, thus properly preparing the same for the application of the beading tool. The cutters may be mounted on the carrier blocks in any suitable manner but, in the present instance, each cutter is rotatably mounted on a pin 40, the ends of which are mounted in the carrier block and one end of which is flattened, as shown at 41, to hold the pin against rotation.

Rotary movement may be imparted to the tool and feeding movement imparted to the expanding device in any suitable manner. In the present instance, I have shown the tool as provided with an operating device or wrench similar to that described in the application of Gustav Wiedeke, filed April 27, 1928, Serial No. 273,365 and patented April 29, 1930, patent number 1,756,717. As here shown, the body of the tool has a reduced outer end portion, as shown at 28, this reduced portion being non-circular and preferably square in shape. The expanding device or wedge 20 has connected therewith an actuating rod 29 which extends beyond the end of the body of the tool and is threaded to receive a nut 30 to which is connected a slotted actuating member or handle 31. The square or non-circular end portion 28 of the tool is adapted to receive a socket member 32 of a ratchet wrench 33. The socket member is provided with teeth 35 adapted to be engaged by a spring pressed pawl 36 mounted in the body of the wrench so that the movement of the wrench in one direction will actuate the socket member 32 and upon the movement of the wrench in the other direction the handle or body portion thereof will move with relation to the socket member. The handle portion of the wrench is provided with a projection 37 which extends through the slot in the handle or nut actuating member 31, the arrangement being such that upon the forward movement of the handle the socket member and actuating tool, including the nut 30, will rotate in unison. Upon the return movement of the handle the latter will move with relation to the socket member and tool but the projection 37 will cause the nut to be rotated in a direction to advance the expanding device 20 preparatory to the next operation of the cutters. The projection 37 is preferably pivotally mounted upon the body of the wrench and, as here shown, the latter is provided with a socket 38 into which the projection may be folded. A spring pressed detent 39 acts on the pivoted projection to retain the same in the position to which it has been moved.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a cutting tool of the character described, a rotatable supporting structure, a cutter rotatably mounted on said supporting structure, and a rotatable disk carried by said supporting structure and having a peripheral portion to travel in the kerf formed by said cutter, said portion of said disk being of such thickness that it will enlarge said kerf beyond the thickness of said cutter, said disk having a tapered hub to engage and flare the end portion of the tube which is being cut.

2. In a cutting tool of the character described, a rotatable supporting structure, a cutter rotatably mounted on said structure, and means to impart radial movement to said cutter, said cutter having a tapered hub to engage and flare the end portion of the tube at the completion of the cutting operation.

3. In a cutting tool of the character described, a rotatable supporting structure, a cutter carried by said supporting structure, a member carried by said supporting structure and arranged to travel in the kerf formed by said cutter and spread the walls thereof to permit the free movement of the cutter therein, and means for moving said cutter and said member radially with relation to said supporting structure and for causing a greater radial movement with reference to the rotatable supporting structure to be imparted to said cutter than is imparted to said member.

4. In a cutting tool of the character described, a rotatable supporting structure, carriers mounted on said supporting structure for substantially radial movement, a cutter rotatably mounted on one of said carriers, a disk rotatably mounted on another of said carriers and having a peripheral portion to travel in the kerf formed by said cutter, said portion of said disk being of such thickness that it will enlarge said kerf beyond the thickness of said cutter, and an expanding device acting on said carriers simultaneously to impart radial movement to said cutter and said disk, said expanding device being so arranged with relation to said carriers that said cutter will be moved radially a greater distance with reference to the rotatable supporting structure than said disk is moved.

In testimony whereof, I affix my signature hereto.

GUSTAV WIEDEKE.